United States Patent [19]

Åsberg

[11] 4,211,438
[45] Jul. 8, 1980

[54] COUPLING ARRANGEMENT FOR TWO CO-AXIAL VACUUM CLEANER CONDUITS

[75] Inventor: Gustaf A. Åsberg, Stockholm, Sweden

[73] Assignee: Aktiebolaget Electrolux, Stockholm, Sweden

[21] Appl. No.: 895,442

[22] Filed: Apr. 11, 1978

[30] Foreign Application Priority Data

Apr. 18, 1977 [SE] Sweden .............................. 7704397

[51] Int. Cl.² .................................................. A47L 9/24
[52] U.S. Cl. ........................................ 285/7; 285/281; 285/174; 285/319; 285/DIG. 22
[58] Field of Search ..................... 137/360, 873, 874; 285/7, 319, 281, DIG. 22, 423, 158, 159, 174, 175, 376, 401, 402

[56] References Cited
U.S. PATENT DOCUMENTS

| | | | |
|---|---|---|---|
| 2,729,474 | 1/1956 | Unger | 285/281 X |
| 2,774,554 | 12/1956 | Ashwood et al. | 137/873 X |
| 3,565,464 | 2/1971 | Wolf | 285/7 |
| 3,684,321 | 8/1972 | Hundhausen | 285/423 X |
| 3,711,125 | 1/1973 | Dehar | 285/319 |
| 4,067,534 | 1/1978 | Frey | 285/319 |
| 4,099,744 | 7/1978 | Kutnyak et al. | 285/7 |

FOREIGN PATENT DOCUMENTS 1416791 12/1975 United Kingdom ...................... 285/93

*Primary Examiner*—Dave W. Arola
*Attorney, Agent, or Firm*—Alfred E. Miller

[57] ABSTRACT

A connection for two co-axially arranged conduit parts of a vacuum cleaner. The connection includes a coupling which has means for turnable mounting the vacuum cleaner hose relative to a coupling member on the vacuum cleaner housing. The connection further comprises an outer and inner sleeve, with the latter being provided with said turnable means in the form of claws which are adapted to slidingly fit in a peripheral groove in a tubular portion of the coupling member.

8 Claims, 2 Drawing Figures

COUPLING ARRANGEMENT FOR TWO CO-AXIAL VACUUM CLEANER CONDUITS

BACKGROUND OF THE INVENTION

This invention relates to a connection for two conduit parts of a vacuum cleaner, such as the air hose and a coupling member which can be connected to the vacuum cleaner housing.

A principal feature of the invention is that a connecting element is securely connected to the hose, and is provided with means for turnable mounting of the hose in relation to the coupling member. In accordance with the teachings of the invention, the connecting element comprises a sleeve securely connectable with the hose, said sleeve at its free end having a plurality of peripheral claws which are intended to engage with a groove in the coupling member in order to facilitate the turning movement of the sleeve, and thereby of the hose in relation to the coupling member.

In order that the invention will be more clearly understood, it will now be disclosed in greater detail with reference to the accompanying drawings, in which:

FIG. 1 shows a perspective, exploded view of the components of the connection; and FIG. 2 is a longitudinal section of the connection, in an assembled condition.

DESCRIPTION OF THE PREFERRED EMBODIMENT

Figure 1:
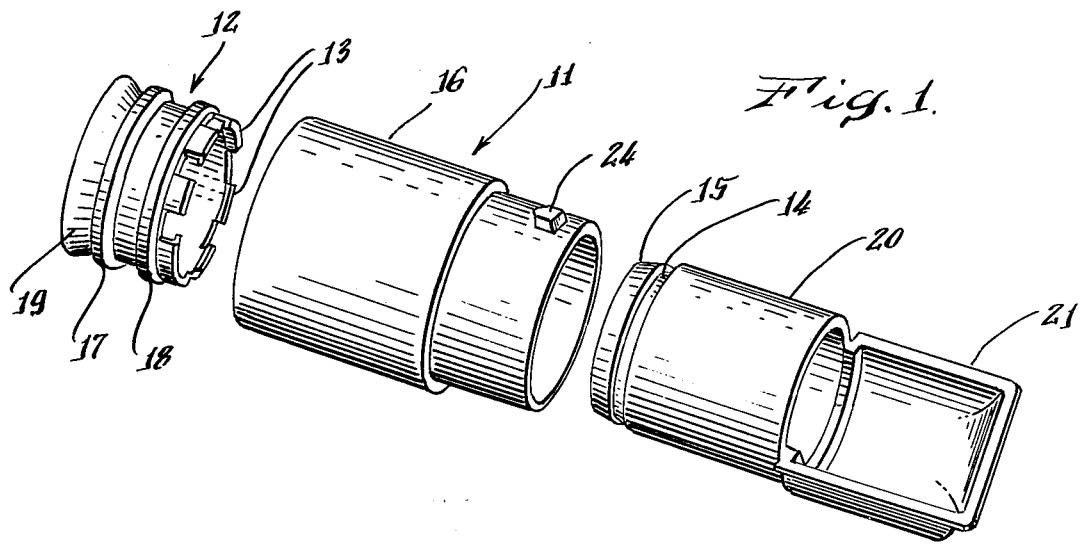
Figure 2:
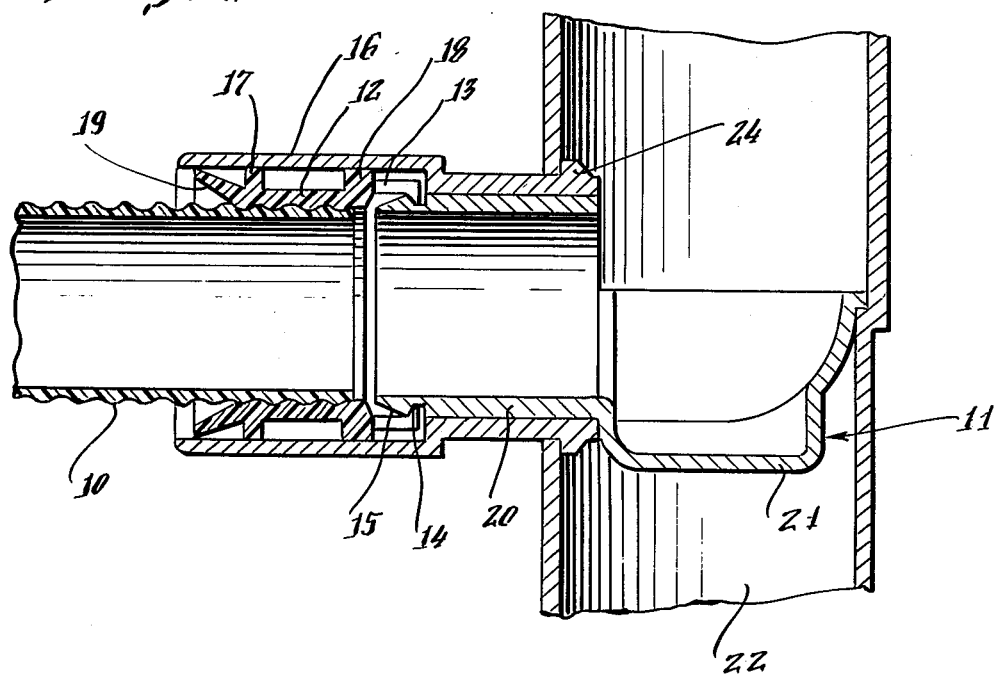

In FIG. 2 the reference numeral 10 designates a hose of the type, for example, being intended for household use and the like, and being connected to the apparatus by a coupling member turnably connected with the hose, said coupling member, as a whole, being designated by the reference numeral 11. In the embodiment shown, the coupling member has the form of a valve which is more specifically described hereinafter.

Between the hose and the coupling member is a connecting element that is arranged in the form of a sleeve 12, that may be fabricated of plastic or other flexible material and which has one of its ends threaded on the corrugations of the hose or in another suitable way secured to the hose, for instance by gluing, so that it is firmly connected to the hose 10. In its other end, the sleeve 12 has a number of peripheral claws 13 arranged to engage with a groove 14 adapted in the envelope surface of the coupling member 11, so that the capability of a turnable movement between the sleeve 12 and the coupling member 11 is obtained. The sleeve 12 is at the same time being locked in an axial direction. The claws 13 have the form of bodies with L-shaped cross section and turned towards the center of the sleeve 12, the diametrical distance between their free end surfaces somewhat exceeding the outside diameter of the groove 14.

The groove 14 is mainly U-shaped and has an initial surface 15 slanting in relation to the longitudinal axis of the coupling member 11, said surface being arranged in the free end of the coupling member 11, which end cooperates with the sleeve 12 so that the claws 13 can be more easily inserted in the groove 14.

A sealing sleeve 16 is surrounding the sleeve 12, on one hand to obtain an airtight connection between the hose 10 and the coupling member 11, and on the other hand to join the coupling member and the apparatus. As seen in FIG. 2 the sleeve 12 has two radial elevations 17, 18, which are spaced from each other, and which extend circumferentially around the sleeve 12. The envelope surfaces of the radial elevations are intended to seal with the inner surface of the sleeve 16, and to guide the sleeve 12 inside the sealing sleeve 16. Moreover, in the end of the sleeve 12, which is opposite to the location of the claws 13, there is a tongue 19 which slants in relation of the longitudinal axis of the sleeve 12, and is shaped for additional sealing between the two sleeves 12, 16.

The coupling member 11 is in the form of a valve and comprises a tubular portion 20, which is a projecting portion and is provided with the groove 14. The part of the coupling member remaining in the air channel 22 connected to the vacuum cleaner housing is a scoop-shaped portion 21. It should be evident that the arrangement according to the invention can be used advantageously for vacuum cleaners of the so called "upright" model, which, when the apparatus is moved across the floor, takes in dust-laden air through a suction opening on the underside of the apparatus through an air channel 22, which is only partly shown in FIG. 2.

When using the apparatus for so called off-floor cleaning, i.e. cleaning of furniture or the like, a suction hose can be connected to the apparatus by means of the coupling member 11, which for this purpose, in its free end, has preferably two or three projections 24, for locking of the coupling member and thereby of the hose to the apparatus. An opening, which can be closed by a cover (not shown) is arranged in the housing of the apparatus so that it communicates with the air channel 22 leading to the dust container of the apparatus (not shown).

After the coupling member 11 has been inserted through this opening and has been locked in its position by means of the projections 24 the scoop-shaped portion 21 of the coupling member closes the portion of the air channel leading to the suction opening and a new passage 23 is opened for the air flowing through the hose 10 to the dust container through air channel 22.

Because the hose 10 is turnable relative to the coupling member 11, on one hand, locking of the hose on to the apparatus, and on the other hand the use of the vacuum cleaner are made easier, as the tendency of the hose "to make a knot" is eliminated. The present assembly comprises few details and is very easy to assemble. After connecting the sleeve 12 to the hose, for example by threading, the sealing sleeve 16 is placed on to the sleeve 12 and the tubular portion 20 of the coupling member 11 is inserted in the sleeve 16 until the claws 13 engage with the groove 14 and effectively connect the sleeve 12 with the coupling member 11. The resilient force of the claws 13 is adjusted so that the connection between the two portions can be considered firm, and it cannot be disconnected without destroying the coupling.

Although only one embodiment has been shown and described, it should be evident that several modifications are conceivable within the scope of the invention, as it is described in the following claims.

What is claimed is:

1. A connection between two coaxially arranged conduit portions of a vacuum cleaner in which one of said conduit portions is a coupling member to an air channel of said vacuum cleaner and having a projection part, and the other conduit portion is a hose comprising: an inner sleeve connecting part firmly secured to said hose and provided with means coacting with means on said coupling member for mounting said hose against axial movement and allowing rotatable movement relative to said coupling member, and an outer sealing sleeve surrounding said inner sleeve for obtaining an air tight connection between said hose and coupling member and to join said coupling member to said vacuum cleaner air channel, said inner sleeve having at least one projection on its outer peripheral surface thereof, which coacts with a portion of inner surface of said surrounding outer sealing sleeve for sealing said inner sleeve within said outer sealing sleeve and for guiding said inner sleeve within said outer sealing sleeve when said hose and coupling are joined, and said outer sleeve having a portion thereof at one end which fits over and tightly engages the outer surface of said projecting part of the coupling member, and means on the free end of said portion of the outer sleeve for securing said outer sleeve to said air channel to thereby lock said coupling member to said vacuum cleaner air channel.

2. The connection as claimed in claim 1 wherein said means on said inner sleeve and said coupling member includes a plurality of spaced peripheral claws on the free end of the inner sleeve and at least a partial circumferential groove in said coupling member, said claws being adapted to be inserted in said groove thereby permitting the inner sleeve and the hose to turn relative to the coupling member while maintaining the inner sleeve in a fixed position with respect to movement co-axially relative to said coupling member.

3. The connection as claimed in claim 2 wherein said sleeve is fabricated of a flexible material.

4. The connection as claimed in claim 3 wherein said claws are L-shaped in cross-section with the free ends thereof disposed in a direction at right angles to the longitudinal axis of said coupling.

5. The connection as claimed in claim 4 wherein the diametrical distance between said free ends of said claws slightly exceeds the inner diameter of said groove.

6. The connection as claimed in claim 2 wherein said groove is substantially U-shaped, said coupling having its extreme free end in the form of a slanting surface relative to the longitudinal axis of said coupling member, said slanting surface co-acting with said claws on said sleeve to assist in the seating of said claws in said groove.

7. The connection as claimed in claim 1 wherein said inner sleeve is provided with two spaced radial projections extending about the circumference of said sleeve, the free ends of said projections being for sealing said sleeve within said outer sealing sleeve and for guiding said sleeve within said outer sealing sleeve.

8. The connection as claimed in claim 7 further comprising a projecting sealing element on said inner sleeve which is slanted upwardly relative to the longitudinal axis of said inner sleeve and located on the end of said inner sleeve opposite to said claws.

* * * * *